(12) United States Patent
Chan

(10) Patent No.: US 6,324,628 B1
(45) Date of Patent: Nov. 27, 2001

(54) PROGRAMMING FLASH IN A CLOSED SYSTEM

(75) Inventor: Victor G. Chan, Saratoga, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/379,711

(22) Filed: Aug. 24, 1999

(51) Int. Cl.[7] .................................................. G06F 12/14
(52) U.S. Cl. ............................................. 711/163; 711/5
(58) Field of Search ........................................ 711/163, 5

(56) References Cited

U.S. PATENT DOCUMENTS 5,237,616 * 8/1993 Abraham et al. .................... 711/163

* cited by examiner

*Primary Examiner*—Jack A. Lane
(74) *Attorney, Agent, or Firm*—Blakely, Sokoloff, Taylor & Zafman LLP

(57) ABSTRACT

A method and a system for reprogramming a closed device are disclosed. In one embodiment, the system contains an external memory coupled to a limited access device. The limited access device includes a processor, an internal memory, a select control circuit, an internal data bus, and an external data bus. The internal memory is not accessible except through predefined input and output ports of the select control circuit, which are accessible external to the closed device. The select control circuit selects the external memory as primary memory in response to assertion of a control signal and selects the internal memory as primary memory in response to deassertion of a control signal. The internal data bus transports data within the limited access device which includes the internal memory and the select control circuit and the external data bus transports data between the select control circuit and the external memory.

20 Claims, 4 Drawing Sheets

PROGRAMMING FLASH IN A CLOSED SYSTEM

BACKGROUND OF THE INVENTION

1. Field of the Invention

The present invention relates generally to the field of computer systems. Specifically, the present invention relates to an implementation of a limited access device.

2. Description of the Related Art

To enhance data security in digital processing systems, closed or limited access devices to secure data access have become increasingly popular. Such closed or limited access devices, hereinafter referred to as closed devices, are particularly useful in certain military as well as government applications. A closed device is generally enclosed in a sealed chamber typically formed by metal, composite materials, or chemical coatings that are tamper resistant.

Like a typical digital processing system, a closed device generally contains a plurality of components, such as processor and memory chips. These chips may be mounted on a multi-chip module ("MCM").

However, once the MCM is sealed in the chamber, it is almost impossible to access the components except through a limited number of I/O ("input and output") ports. A MCM will not function correctly if data stored in a memory chip is corrupted. Because a sealed MCM is protected from external access, the MCM may have to be disposed of if the data stored in a memory chip of the MCM is corrupted.

SUMMARY OF THE INVENTION

A method and a system for reprogramming a closed device are described. In one embodiment, the system contains an external memory coupled to a closed device. The closed device includes a processor, an internal memory, a select control circuit, an internal data bus, and an external data bus. The internal memory, which is coupled to the processor, is not accessible except through predefined input and output ports of the select control circuit, which are accessible external to the closed device.

The select control circuit selects the external memory as primary memory in response to assertion of a control signal and selects the internal memory as primary memory in response to deassertion of the same control signal. In one embodiment, the primary memory stores programs, such as instructions, machine check handlers, and control code. The internal data bus transports data within the closed device, which includes the internal memory and the select control circuit, and the external data bus transports data between the select control circuit and the external memory.

BRIEF DESCRIPTION OF THE DRAWINGS

The objects, features and advantages of the present invention will be apparent to one skilled in the art from the following detailed description in which.

DETAILED DESCRIPTION

A method and a system for accessing a closed device are disclosed. In the following description numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention.

In one embodiment, a system contains an external program memory and a closed device. The closed device contains an internal program memory. The program memory may store the operating system code, machine check handlers, and diagnostic code. To enhance system security, the closed device is physically enclosed in a sealed chamber so that alteration of internal memory must follow certain procedure. It should be noted that after the chamber is sealed, it may be difficult to update data stored in the internal memory if the program stored in the internal memory is corrupted. However, in one embodiment, a mechanism is provided to update the internal corrupted program memory after the chamber is sealed.

Figure 1:
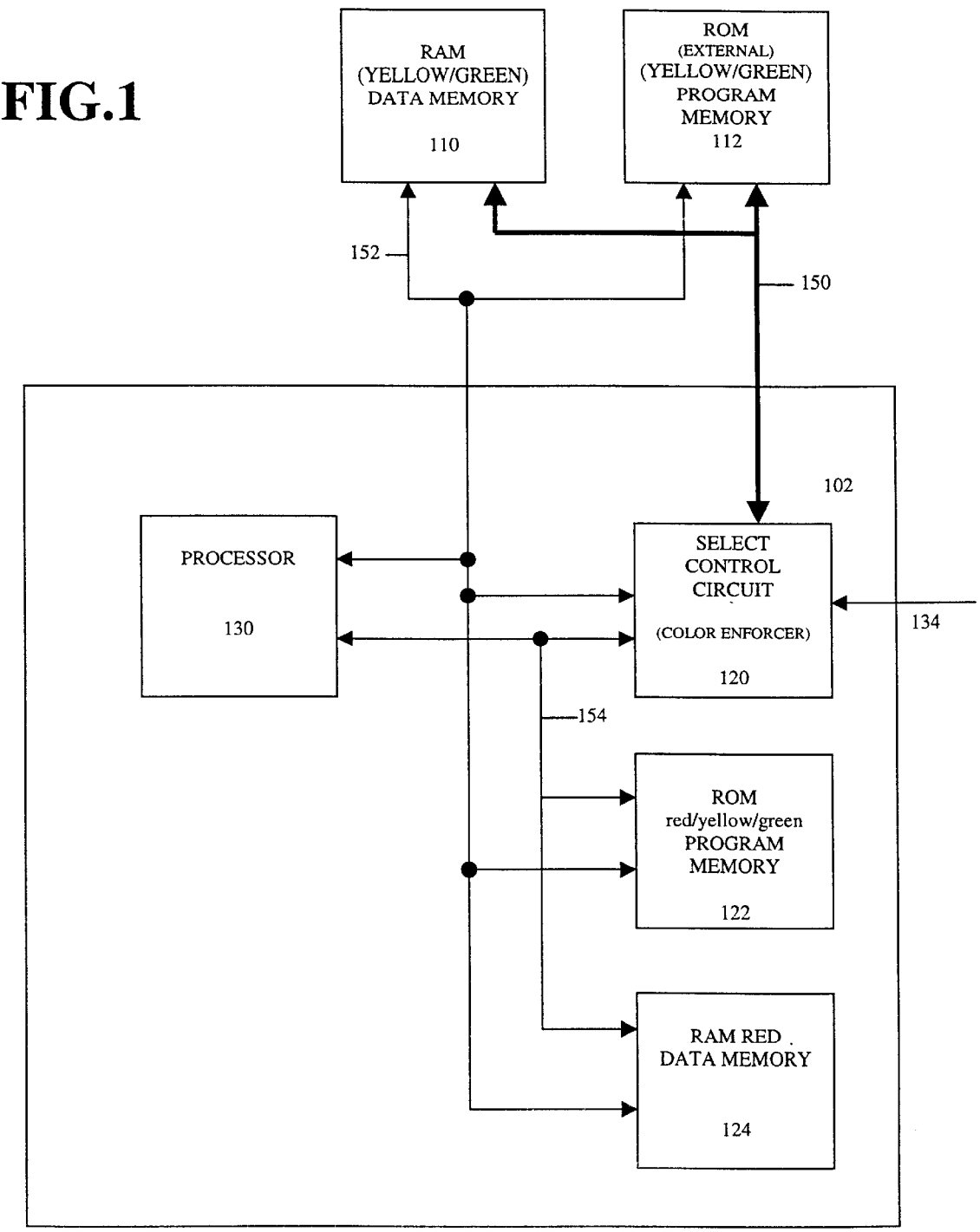
FIG. 1 is a block diagram illustrating one embodiment of a system including a closed device.

FIG. 1 illustrates an embodiment of a closed system 100. It should be noted that close system 100 may include additional logic, processing components, and/or storage components not essential to the understanding of the present invention. The system 100 includes a RAM ("random access memory") data memory 110, a ROM ("read only memory") program memory 112, and a closed device 102. In the present embodiment, RAM data memory 110 stores yellow and green data and ROM program memory 112 stores additional yellow and green program memory. The color code is used to indicate a security level. In one embodiment, the yellow/green color code represents a security level for users while the red color code represents a security level for supervisors. In another embodiment, green/yellow functions may only access green/yellow data and red functions can access green, yellow, and red data. It should be realized that the color codes are noted for purposes of discussion only and the present invention is not limited to devices that implement color coded access as discussed above.

A data bus 150 is used to transport data among RAM data memory 110, ROM program memory 112, and the closed device 102. An address bus 152, driven by processor 130, transfers addresses among RAM data memory 110, ROM program memory 112, and various components inside closed device 102. In one embodiment, RAM data memory 110 and ROM program memory 112 may be included in one memory device. In this embodiment, the memory device contains a first bank or portion, which is allocated for RAM data memory 110, and a second bank or portion, which is allocated for ROM program memory 112. It should be noted that in one embodiment ROM program memory 112 may be flash memories.

Closed device 102 includes a tamper resistance boundary. In one embodiment, the tamper resistance boundary is implemented by enclosing the device 102 in a sealed chamber. In one embodiment, closed device 102 includes a color enforcer 120, a ROM program memory 122, a RAM red data memory 124, and a processor 130. Processor 130 may be any microprocessor, such as Motorola 68020™ or PowerPC™. In one embodiment, processor 130 is configured to operate at one of two privilege levels: user and supervisor levels. Processor 130 is connected to color enforcer 120 via an internal data/control bus 154.

Color enforcer 120 provides system security. Color enforcer 120 may be a programmable logic device, including, but not limited to an EPLD ("electric programmable logic device") or an ASIC ("asynchronous integrated circuit") device. In one embodiment, color enforcer 120 is a secured access circuit that controls data access within the system. For example, the color enforcer 120 may be configured to control memory access wherein green/yellow functions can only access green/yellow data memories and red functions can access green/yellow/red data memories.

In another embodiment, color enforcer 120, also referred to herein as a select control circuit, provides control logic that allows data bus 150 and data/control bus 154 to be connected or isolated. By selectively connecting data bus 150 and data/control bus 154, ROM program memory 122 can be updated. As shown in FIG. 1, ROM program memory 122 may receive updated data from ROM program memory 112 via internal data/control bus 154, color enforcer 120, and data bus 150. Color enforcer 120 also receives data from or transmits data to the external memory, e.g., memory 110, 112. Consequently, processor 130 and color enforcer 120 controls the data transfer between ROM program memory 112 and ROM program memory 122.

Internal bus 154 is coupled with processor 130, color enforcer 120, and ROM program memory 122 and RAM red data memory 124. In one embodiment, internal bus 154 is used to transfer control signals between processor and color enforcer 120. Moreover, color enforcer 120 is further connected to an external control line 134, which transmits a program memory signal. The program memory signal selects either the internal or external program memory as the primary memory for processor 130 to execute instructions.

Figure 2:
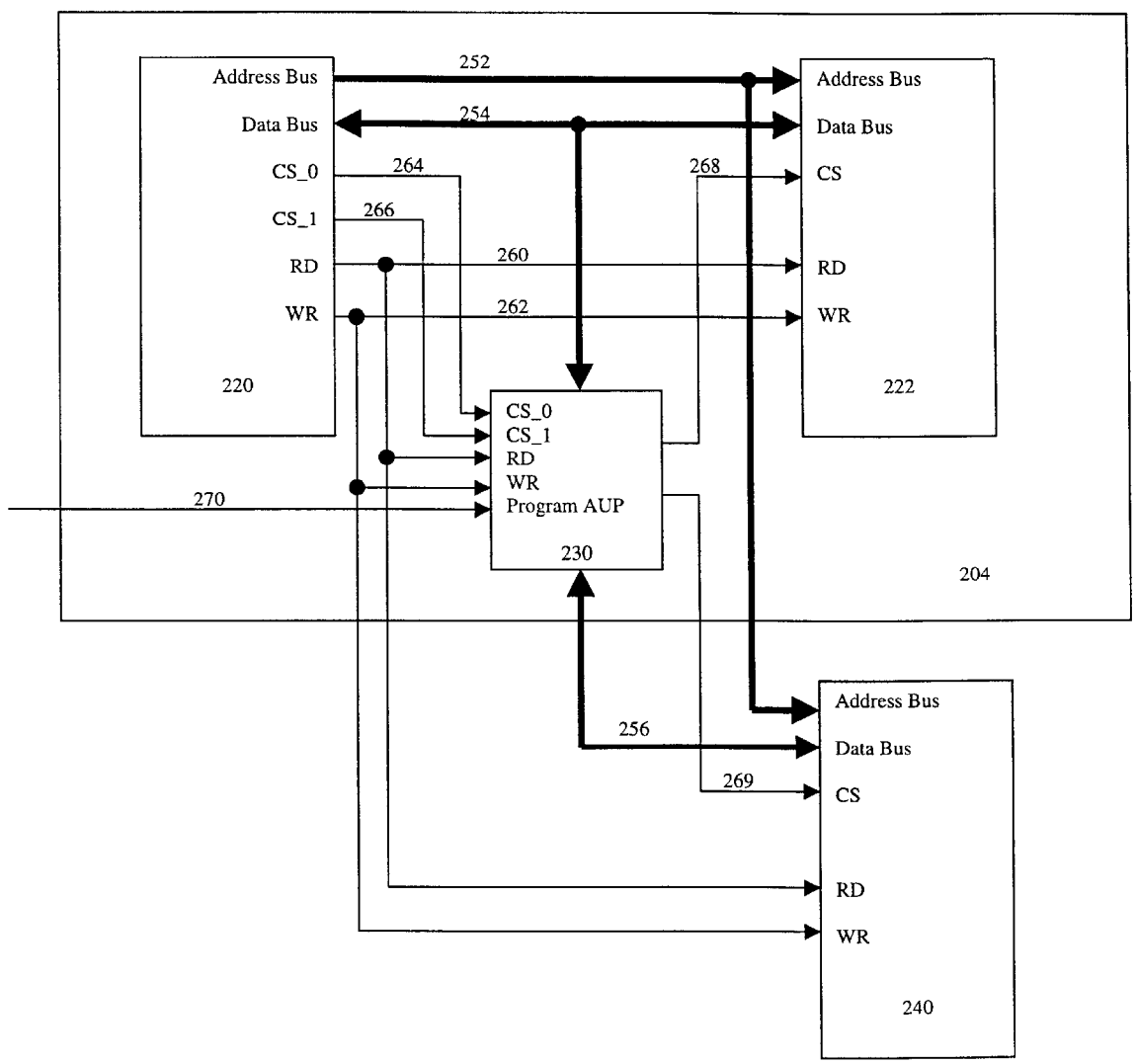
FIG. 2 is a block diagram illustrating one embodiment of a closed device and an external memory.

FIG. 2 is a simplified block diagram illustrating a connection of the external memory 240 to the internal memory 222 through the select control logic 230. Processor 220, internal memory 222 and select control logic 230 are located in a closed device 204. In one embodiment, external memory 240 is a ROM or a flash ROM. External memory 240 is connected to an address bus 252, an external data bus 256, a chip select ("CS") signal line 269, a read ("RD") signal line 260, and a write ("WR") signal line 262. It should be noted that other signals, such as clock signals, may also be coupled to memory 240, but are not included herein for the purposes of discussion.

Closed device 204 may be physically enclosed in a tamper resistance material or a chamber or secured in some other manner in order to prevent unauthorized access or alteration. Closed device 204 includes a processor 220, an internal memory 222 and a select control logic 230. Address bus 252 is connected with processor 220, internal memory 222, and external memory 240. Internal data bus 254 is coupled with processor 220, internal memory 222, and select control logic 230. External data bus 256 is coupled with select control logic 230 and external memory 240. Moreover, a chip select 0 signal line ("CS_0") 264 and chip select 1 signal line ("CS_1") 266 are coupled with access logic 230 and processor 220. Internal and external memories 222, 240 receive two separate CS signal lines from logic 230 via signal lines 268 and 269, respectively.

Select control logic 230 also receives a program memory signal 270. Program memory signal 270 is generated outside of closed device 204. The program memory signal 270 is used to select either the internal or the external memory as the primary memory. Select control logic 230 controls data transfer between processor 220 and external memory 240 and between processor 220 and internal memory 222. For example, to transfer data from external memory 240 to internal memory 222, processor 220 reads data from external memory 240. Select control logic 230 subsequently allows data buses 254 and 256 to be connected for this read cycle. Processor 220 will then write the data to internal memory 222 with select control logic 230 isolating data buses 254 and 256 since there is no need for the data to go outside of closed device 204.

During typical operating conditions when the program memory signal 270 is not asserted, processor 220 selects internal memory 222 as primary memory. Processor 220 always uses CS_0 to select the primary memory and CS_1 to select a secondary memory. Select control logic 230 responds to CS_0 by generating internal chip select signal 268, which selects internal memory 222 as the primary memory, and responds to CS_1 by generating external chip select signal 269, which selects external memory 240 as the secondary memory.

In an alternate embodiment, when internal memory 222 is corrupted (or blank) and program memory signal 270 is asserted, processor 220 executes programs (or instructions) from external memory 240. Upon assertion of program memory signal 270, select control logic 230 switches the chip select signals to memory 222 and 240 and selects external memory 240 as the primary memory. After external memory 240 is selected as primary memory, processor 220 executes instructions read from external memory 240. The instructions located on external memory 240 may include instructions, which when executed, reprogram the internal memory 222. In addition, the external memory 240 may include the program data to be loaded into the internal program memory 222. Thus, reprogramming a corrupt or blank internal memory 222 is possible only when external memory 240 becomes the primary memory.

Figure 3:
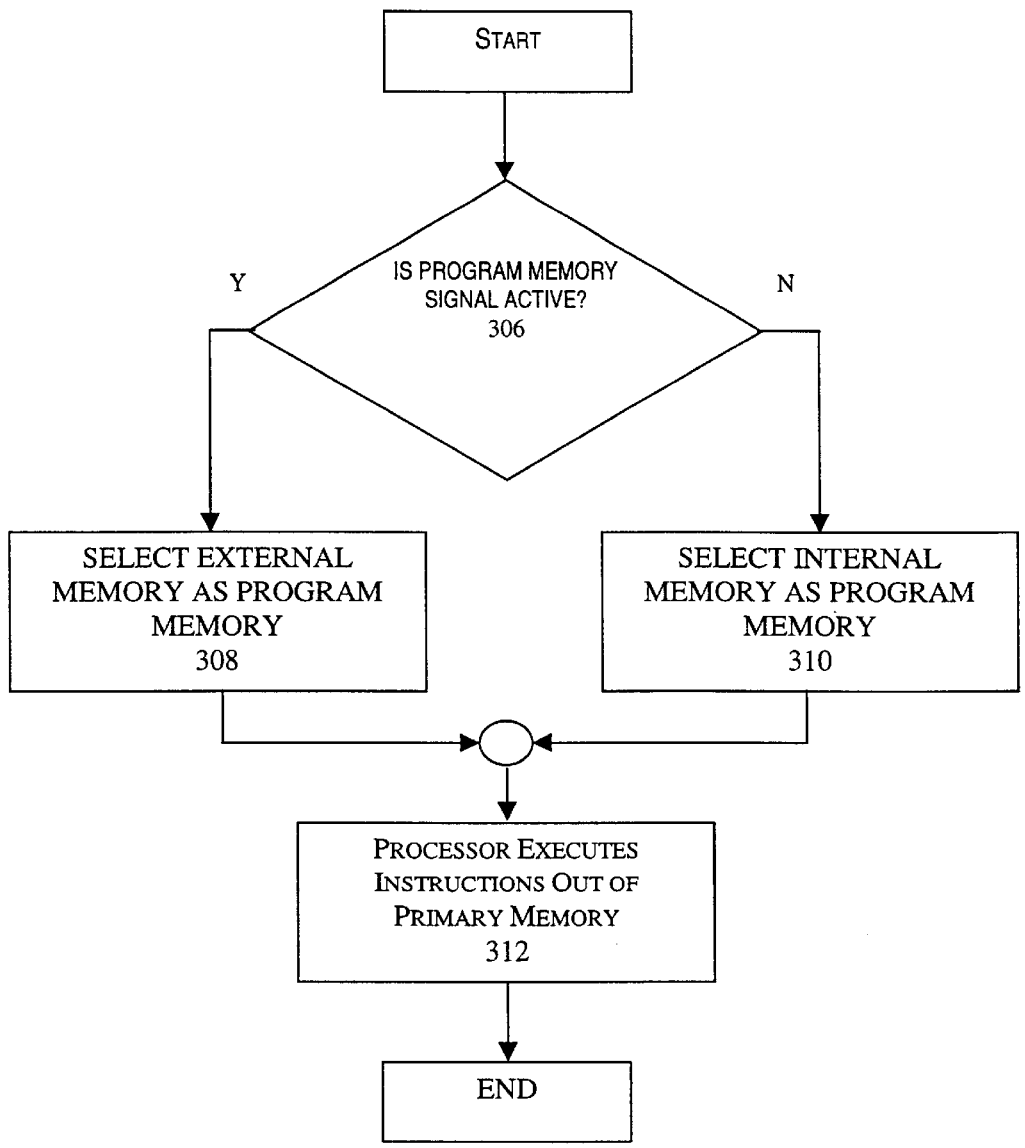
FIG. 3 is a flow chart illustrating the teachings of one embodiment of a process of selecting a primary memory in accordance with the present invention.

FIG. 3 is a flow chart 300 illustrating one embodiment of a process for selecting a primary program memory. At block 306, it is determined whether the program memory signal is active. If the program memory signal is inactive, the internal memory is or continues to be selected as the primary memory at block 310. If block 306 is true, which means that the program memory signal is active, then at block 308, the external memory is selected as the primary program memory. At block 312, the processor will execute instructions from the primary memory. The internal memory does not have to be corrupted in order to use the program memory signal feature.

Figure 4:
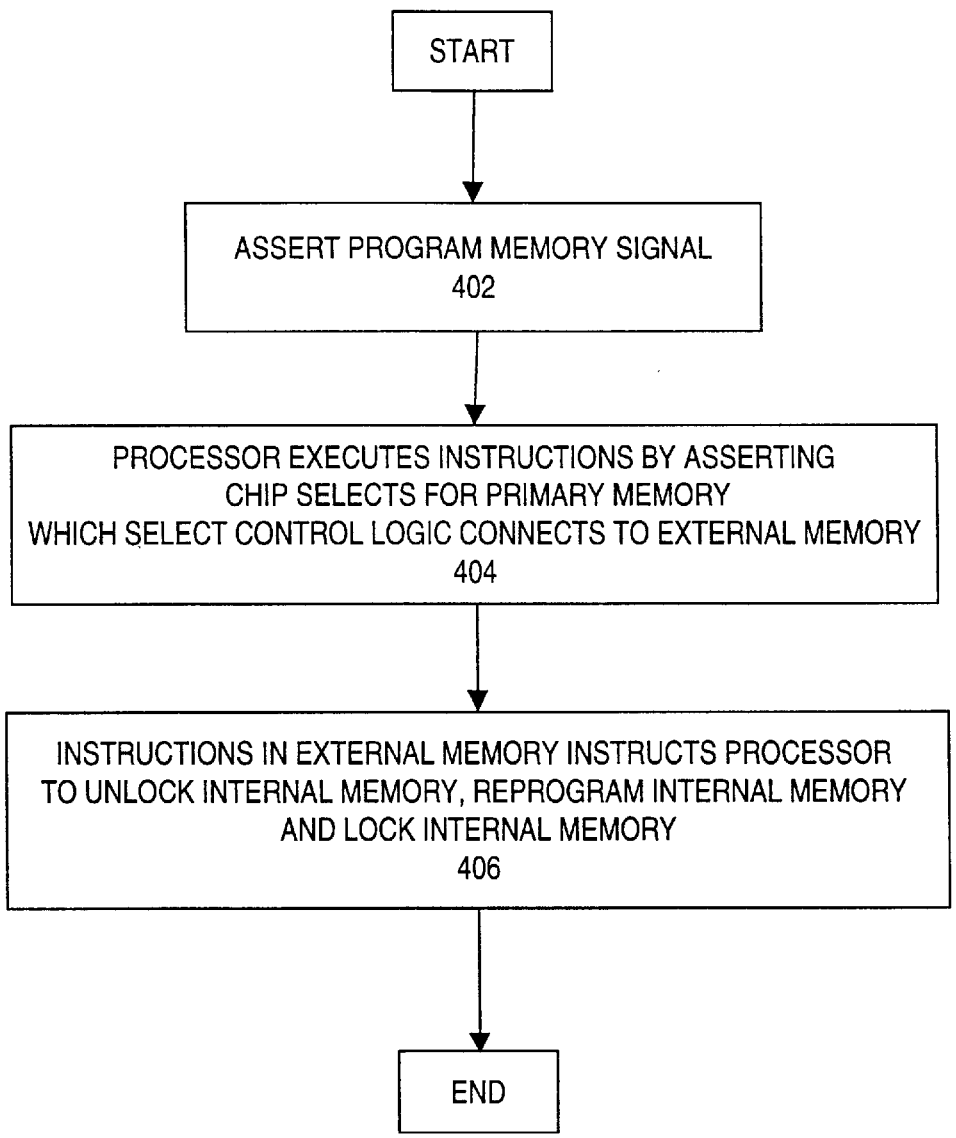
FIG. 4 is a flow chart illustrating one embodiment of programming a closed device in accordance with the teachings of the present invention.

FIG. 4 is a flow chart 400 illustrating one embodiment of a method for programming a closed device. A program memory signal is asserted at block 402. Block 404 shows that the processor executes instructions by asserting chip selects for primary memory which select control logic connects to external memory. At block 406, instructions in external memory forces processor to unlock internal memory, reprogram internal memory, and lock internal memory. Therefore, reprogramming the internal memory can be achieved when the external memory becomes the primary memory.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A system comprising:
   an external memory; and
   a closed device, coupled to said external memory, wherein said closed device includes:
   a processor coupled to said external memory;
   an internal memory coupled to said processor, wherein said internal memory is not accessible except access through predefined input and output ports that are internal to said closed device;
   a select control circuit coupled to said processor and configured to select said external memory as primary memory in response to assertion of an external control signal and to select said internal memory as primary memory in response to a deassertion of said external control signal;
   an internal data bus, coupled with said select control circuit, said processor, and said internal memory, said internal data bus residing solely within said closed device with no external access; and
   an external data bus, coupled with said select control circuit and said external memory, configured to transport data between said select control circuit and said external memory.

2. The system as set forth in claim 1, wherein said select control circuit is further configured to transfer data to and from said internal and external data buses and furthermore a mean of isolation between two said buses.

3. The system as set forth in claim 2, wherein said select control circuit enables said internal memory to be updated when said external memory is selected as primary memory.

4. The system as set forth in claim 1 further including a control device, wherein said control signal represents logic states of a program control signal generated by said control device.

5. The system as set forth in claim 1, wherein said control signal is selectively applied to an input port accessible external to said closed device.

6. The system as set forth in claim 1, wherein said primary memory is configured to store supervisory code.

7. The system as set forth in claim 1, wherein said primary memory is configured to store programming code which when executed by a processor, initializes said closed device.

8. The data processing system of claim 1, wherein said closed device further comprises a random access memory ("RAM") coupled to said processor, said random access memory configured to store data.

9. The system as set forth in claim 1, wherein said internal memory is a flash read only memory ("ROM").

10. The system as set forth in claim 1, wherein said select control circuit is a secured access circuit that is configured to control access to memory devices within the system.

11. The system as set forth in claim 1 further comprising at least another external memory externally coupled to said closed device and configured to store data.

12. A method for accessing a closed system comprising:
    receiving a program control signal that originates from outside of said closed system;
    selecting a primary memory located outside of said closed system and coupled to said closed system as a program memory in response to assertion of said program control signal;
    selecting a primary memory located inside of said closed system as program memory in response to deassertion of said program control signal; and
    executing instructions received from said program memory.

13. The method as set forth in claim 12 further comprising updating said memory located inside of said closed system when said memory located outside of said closed system is selected as program memory.

14. The method as set forth in claim 12 further comprising initializing said closed system utilizing code stored in said memory located outside of said closed system.

15. The method as set forth in claim 12 further comprising:
    utilizing an external data bus to transport data between said memory located outside of said closed system and said select control circuit; and
    utilizing an internal data bus to transport data between said memory located inside of said closed system and a select control circuit.

16. The method of claim 15, wherein when said memory located outside of said closed system is selected as primary memory, the method further comprising:
    unlocking said memory located inside of said closed system;
    loading instructions from said memory located outside of said closed system to said memory located inside of said closed system; and
    locking said memory located inside of said closed system.

17. A system comprising:
    an external memory;
    a closed device, coupled to said external memory, said device comprising an internal memory and a select control circuit coupled to said external memory and said internal memory, said select control circuit configured to:
    receive a program control signal from outside of said closed device,
    select said external memory located outside of said closed device as program memory in response to an active state of said program control signal,
    select said internal memory located inside of said closed device as program memory in response to an inactive state of said program control signal, and
    reprogram said internal memory when said external memory is selected as program memory.

18. The system of claim 17, wherein said system includes:
    an external bus coupled to said select control circuit and configured to transport data between said external memory and said select control circuit; and
    an internal bus coupled to said select control circuit and configured to transport data between said internal memory and said select control circuit.

19. The system of claim 17, wherein said reprogram said internal memory further comprises:
    unlocking said internal memory;
    updating said internal memory in response to data stored in said external memory; and
    locking said internal memory upon completion of updating.

20. The system of claim 17, wherein said external memory further comprises a first bank and a second bank, wherein said first bank is configured to store program code and said second bank is configured to store data.

* * * * *